Patented Dec. 30, 1941

2,268,347

UNITED STATES PATENT OFFICE 2,268,347

HEMOSTATIC

Arthur Steinberg, Phildelphia, Pa.

No Drawing. Application January 9, 1939,
Serial No. 249,884

5 Claims. (Cl. 167—58)

The present invention relates to hemostatics and preparation and employment of the same, this application being a continuation in part of my application, Serial No. 64,335, filed January 17, 1936.

It has been found that many types of materials utilized as hemostatic agents are toxic and are not particularly effective and it has particularly been found that alkaloid or protein containing materials are not very satisfactory and often result in untoward effects.

It is among the objects of the present invention to provide a method for controlling the clotting time of the blood by usual methods of administration which will give positive control enabling assured stoppage of excessive bleeding without the need of administering alkaloid or protein containing solutions.

Another object of the present invention is to provide materials and products suitable for administration to enable reduction of the clotting time of the blood, which materials and products will be of non-toxic character, will cause no harmful effects and which materials may be produced at low cost in a condition of high purity suitable for usual methods of administration.

Other and further objects and advantages will also appear from the more detailed description given below, it being understood, however, that this more detailed description is given by way of limitation and explanation only and not by way of limitation, since various changes therein may be made by those skilled in the art without departing from the scope and sphere of the present invention.

It has now been found that certain materials or extracts, preferably of plant origin and are most desirably derived from the roots, stems and leaves of plants or from germinating seeds, and less preferably from certain animal tissues, may be most readily effectively employed for hemostatic purposes.

Among the preferred materials from which hemostatic substances may be extracted are shepherd's - purse (*Capsella bursa-pastoris*), leaves of the sorrel, whole beets or beet waste left after the extraction of sugar, and many other types of vegetable materials.

To obtain maximum yields, these materials, and particularly shepherd's-purse, may be prepared in ground dehydrated condition.

Then the ground material may be mixed with a concentrated mineral acid, such as concentrated hydrochloric acid, followed by extraction with a volatile organic solvent.

The preferred organic solvent is ether and the ether and the raw material may be percolated or extracted with a Soxhlet apparatus, although other volatile solvents may be employed. Alcohols, such as ethyl alcohol, and ketones, such as acetone, are generally less preferred and it is desirable not to employ hydrocarbons or chlorinated hydrocarbons.

Following the extraction with percolation or a Soxhlet apparatus, the ether may be boiled off leaving a gummy, brown liquid which may be taken up in water or dilute acid.

The aqueous acid solution which is obtained may again be boiled and filtered and this filtrate, which should be acid, may then be treated with a weak alkali, such as for example sodium or potassium carbonate or lime water or some other salt of a strong alkali and a weak acid to a pH of substantially above 7, as for example to a pH of 9 or 10.

A color change takes place in the liquid indicating when the proper pH is arrived at, when the extraction is made from shepherd's-purse. This change in color is from yellow to reddish orange and usually a brown precipitate is formed.

Where the precipitate is formed, it will be found of reddish-brown color and this precipitate may be dissolved in dilute hydrochloric acid or other mineral acids with adjustment of the pH so that it is just alkaline to Congo red. The preferred pH should be between 1 and 4, with a preferred range of 3.2 to 3.4.

In the above procedure, many of the steps may be omitted with certain types of vegetable materials, and for example after the first boiling operation, followed by filtration, the solution may then be directly utilized as a hemostatic with suitable adjustment of the pH to 3 to 4.

As alternative to the above method, it is also possible to make an acid aqueous extract of the vegetable material, such as for example shepherd's-purse, a preferred extracting agent for example being a concentrated hydrochloric acid having an HCl concentration of 10 to 30%. This extract may be neutralized and/or precipitated with an alkali, such as calcium hydroxide or lime water, and then the precipitate may be taken up with acid and ether or some other organic solvent which is removed by evaporation and then the solid residue is finally placed in water solution having a desired pH of 3 to 4.

It is most important in the above procedures that substantially all alkaloids and proteins be eliminated in the extraction procedure and it is desirable to avoid hydrocarbons or chlorinated hydrocarbons as the volatile solvent, although alcohol and acetone may in certain instances be utilized in lieu of the ether or in combination with the ether.

The preferred hemostatic solution should preferably have a solid concentration varying from ½ to 10 milligrams of solids in a 4 cc. dose and a 4 cc. dose should have the effect of reducing the clotting time of a normal individual by 40 to 80%.

Although the above mentioned plants are the preferred, it is also possible to extract the hemostatic from the following materials in smaller or larger quantities, namely: red beets, oxalis (shamrock), geranium, grapes, chenopodia, citrus fruits, rhubarbs, chestnuts, euphorbias, tea, plums, agaricus, tomatoes, bayberry, asparagus, spinach, cabbages, strawberries, celery, algae, broad beans, haricot beans, sugar cane, cocoa, cucumber, gooseberries, carrots, potatoes, turnips, pectin plants, cauliflower, sarsaparilla, liquorice root, alfalfa, yeast, lettuce, sour grass, paprika, balsam of Tolu, pyrethrum flowers. Although these do not give as high yield as shepherd's-purse, nevertheless by extraction procedures as above described they give fairly good yields of the desired hemostatic material.

The hemostatic solution which is produced may be satisfactorily administered intravenously or intramuscularly in concentrations ranging from 0.1 to 2 milligrams of a dibasic acid per cc. in a non-hemolyzing solution, which solution preferably contains various water soluble metallic salts and has a pH ranging preferably from 2.5 to 5. The preferred pH for administration is between 2 to 4, with an optimum range of 2.8 to 3.4.

The hemostatic solution appears to lose its most desirable properties if it is elevated to a pH of 7 or higher.

As a general rule it is desirable to keep the sodium ions as low as possible and to have substantial quantities of calcium, magnesium or iron ions present.

In respect to the extraction above mentioned, the most active ingredient appears to be a carboxylic acid and apparently a di- or poly-carboxylic acid having at least 2 carbon atoms and desirably about 2 carboxylic groups.

It has been found that many carboxylic acids of the general formula $C_nH_{2n-2}O_4$ wherein $n$ equals 2 to 14, have desired hemostatic effect when utilized in solutions varying in concentration from 0.1 to 10 milligrams or more per cc. alone or in the presence of calcium or magnesium salts to give a solution which will not produce hemolysis.

Among the most satisfactory carboxylic acids of this series which have been utilized are oxalic or malonic, separately or in combination, in the preferred dilution and at a pH of about 2 to 4.

Combinations of oxalic and malonic acids are water soluble and can most readily be utilized where water solubility is desired, while the higher of the oxalic acid series are oil soluble and may desirably be utilized in oil solution, as for example in sesame oil for intramuscular injection to give a more prolonged action.

Among the acids which may be employed singularly and in combination in acid solution, with or without the presence of metallic salts are the following whose formulae may be represented by $C_nH_{2n-2}O_4$ where $n$ equals 2 to 14:

Oxalic
Malonic
Succinic
Glutaric
Adipic
Pimelic
Suberic
Azelaic
Sebacic
Nonanedicarboxylic acid
Decamethylene di-carboxylic acid
Brassylic acid
Dodecamethylene di-carboxylic acid The higher members of this series are most satisfactorily utilized in oil solution for intramuscular injection to give more prolonged action, and in such cases smaller quantities of the acid may be employed in the solution.

In addition to these acids, it has also been found possible to utilize their salts and their esters, the preferred esters being the ethyl and methyl esters, which most satisfactorily may be employed in a solution in a vegetable or animal glyceride oil, or in aqueous solution.

For example solutions of ethyl oxalate and ethyl malonate, dissolved in sesame oil to form a 1% solution, may be most effectively utilized upon intramuscular injection. On the other hand, for intravenous injection, one-to-one mixtures of oxalic and malonic acids to form a 1% solution may be very satisfactorily utilized.

It is generally preferred that the $CH_2$ group or groups of the acid be free from substituents, such as hydroxy, amino alkyl, aralkyl, or aryl, groups, although it has been found that many of these substituted acids also have definite hemostatic effect when used in the above manner, although not as satisfactory as the acids of the oxalic series first above mentioned.

Among other acids which have been found satisfactory are pyruvic acid, mesotartaric, citric, cinnamic, glutamic acid, glycollic acid, and glyoxylic acid.

Malic is an exception to the general rule in respect to these acids in view of the fact that it does not appear to have any marked hemostatic effects, but in fact it is an excellent anti-coagulant.

As a general rule it is found most satisfactory to evaluate the strength and value of these compounds in clotting units, each clotting unit being the smallest amount of the hemostatic material which will reduce the clotting time of a five pound rabbit about 50% in 15 minutes after intravenous injection.

It has been found most satisfactory to use injections of 2 cc., each of which contains a total of 4 clotting units. Preferably each cubic centimeter is standardized biologically so that it contains 2 c. u. (clotting units) of the aqueous extract of plant origin. This material does not deteriorate when kept in a cool place, and it is physiologically active for at least one year after manufacture.

The solution promotes prothrombin formation.

as evidenced by a 30 per cent decrease in prothrombin time in 15 minutes after 2 cc. (4 c. u.) given intravenously.

The active agent of the solution is physiologically antagonistic to heparin and hirudin. It is non-toxic. Over-dosage is not possible because the renal threshold for this material is only slightly greater than the physiological level. The possibility of thrombus formation is thereby prevented.

The extract does not contain alkaloids or narcotics. Being protein-free, administrations may be made without fear of anaphylaxis. There is no known idiosyncrasy to other drugs.

The hemostatic solution has proven efficacious in the following conditions: preoperatively as a prophylaxis, postoperatively to control bleeding and in exodontia, uterine bleeding, hematemesis, gastric and duodenal ulcers, wounds, jaundice, hemotysis, postpartum hemorrhages, jaundice, hemophilia and wounds—3 cc. to 5 cc. (6 c. u. to 10 c. u.) intravenously followed by 2 cc. (4 c. u.) intramuscularly within thirty (30) minutes; additional administrations of 2 cc. (4 c. u.) at hourly intervals if hemorrhage persists.

In oozing or capillary bleeding—2 cc. (4 c. u.) intravenously followed by 2 cc. (4 c. u.) intramuscularly within an hour if necessary.

In chronic hemorrhagic dyscrasia (epistaxis, hemophilia, purpura and jaundice) 2 cc. to 4 cc. (4 c. u. to 8 c. u.) 3 times a week until symptoms are allayed.

For infants (hemorrhagic diathesis)—dosage should not exceed 4 cc. (8 c. u.) of which 2 cc. (4 c. u.) should be given intravenously and 2 cc. (4 c. u.) intramuscularly in divided doses of not more than 1 cc. (2 c. u.) in a given site.

In transfusions material may be administered to either donor or recipient, or to both, in amounts of 5 cc. (10 c. u.) intravenously one half hour preoperatively.

Dosage may be varied according to the severity of the hemorrhage.

The following contra-indications may be noted: Peripheral vascular diseases, thrombo angiitis obliterans (Buerger's disease) and allied conditions where there is a predisposition to thrombus.

This hemostatic has also been found to have preventive and curative effects on chicks on the so-called Vitamin K deficient diet which produces hemorrhagic diathesis.

It has been found that 0.6 milligram of solution (that 0.6 milligram in 100 cc.) of oxalic or malonic acid or equivalent amounts of the calcium magnesium or iron salts or the ethyl and methyl esters may be employed. With the higher less water soluble acids of the oxalic acid series, as for example, nonanedi-carboxylic acid, decamethylene di-carboxylic acid, 0.1 milligram of these acids dissolved in 1 cc. of a purified vegetable glyceride oil appear to give a strength of 1 clotting unit.

In forming the hemostatic solution by vegetable extraction, as first above described, it is desirable to reduce the solid content, including the active principle which appears to be a di-carboxylic acid, to a concentration of between 0.1 gram to 1 gram per hundred cc., which hundred cc. may be regarded as containing from 50 to 500 milligrams of the hemostatic principle or carboxylic acid, the remainder being primarily chlorides, phosphates and oxalates of the alkali metals, alkali earth metals and also iron.

This solution obtained by vegetable extraction is desirably preserved by the addition of small amounts of tri-cresol (for example 0.25%) or other sterilizing agents. Sterilization is also obtained by heat and by filtration through an unglazed porcelain (Mandler) filter, or by filtration through a fritted silica glass filter.

Where the pure carboxylic acids are utilized it is found most desirable to dissolve the calcium salts, for example in a dilute acid, to produce a resultant solution of the above-described concentration and pH containing oxalic acid or malonic acid and the calcium salt of the acid such as the calcium salt of hydrochloric acid.

Although extraction from vegetable materials is preferred, and preparation of the solution directly from the dibasic acids is next preferred, it has also been found possible to utilize many types of animal materials, such as urine, blood (particularly foetal), placenta, spleen, liver, bile, saliva, lung, brain, pancreas, lymph tissue, thymus, muscle, kidneys, bone marrow, ground dried fish, and ground bone meal which may be extracted by the procedures above described. The extract of the vegetable and animal materials is termed herein "an extract of biological material."

As many changes could be made in the compounds and methods, and many apparently widely different embodiments of this invention could be made without departing from the scope thereof, it is intended that all matter contained in the above description shall be interpreted as illustrative and not in a limiting sense.

What is claimed is:

1. A hemostatic, for administration hypodermically, in the form of a solution containing as its active principle at least one compound selected from the group consisting of: solutions of dicarboxylic acids of the general formula $$C_nH_{2n-2}O_4$$

where $n$ equals 2 to 14; pyruvic acid; mesotartaric acid; citric acid; cinnamic acid; glutamic acid; glycollic acid; glyoxylic acid; the salts of said acids and the lower alkyl esters of said acids.

2. A hemostatic, to be administered hypodermically, in the form of an aqueous acid solution adjusted to a pH of from 2.5 to 5 which contains as its active principle water-soluble lower alkyl ester of a dicarboxylic acid of the general formula $C_nH_{2n-2}O_4$, where $n$ equals 2 to 14.

3. A hemostatic, to be administered hypodermically, in the form of an oil solution which contains as its active principle an oil-soluble dicarboxylic acid of the general formula $C_nH_{2n-2}O_4$, where $n$ equals 2 to 14.

4. A hemostatic, to be administered hypodermically, in the form of an aqueous acid solution adjusted to a pH of between 2.5 and 5.0 which contains as its active principle a dicarboxylic acid of the general formula $C_nH_{2n-2}O_4$, where $n$ equals 2 to 14.

5. A hemostatic, to be administered hypodermically, in the form of an aqueous acid solution adjusted to a pH of less than 7 which contains as its active principle a dicarboxylic acid of the general formula $C_nH_{2n-2}O_4$, where $n$ equals 2 to 14.

ARTHUR STEINBERG.